US009189299B2

(12) United States Patent
Kannoori et al.

(10) Patent No.: US 9,189,299 B2
(45) Date of Patent: *Nov. 17, 2015

(54) FRAMEWORK FOR SYSTEM COMMUNICATION FOR HANDLING DATA

(71) Applicant: International Business Machines Corporation, Armonk, NY (US)

(72) Inventors: Shashidhar Kannoori, San Jose, CA (US); Randy E. Oyarzabal, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/705,323

(22) Filed: Dec. 5, 2012

(65) Prior Publication Data

US 2013/0097622 A1    Apr. 18, 2013

Related U.S. Application Data

(63) Continuation of application No. 12/956,082, filed on Nov. 30, 2010, now Pat. No. 8,904,411.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)
*G06F 11/36* (2006.01)

(52) U.S. Cl.
CPC ............ *G06F 9/541* (2013.01); *G06F 11/3612* (2013.01)

(58) Field of Classification Search
None
See application file for complete search history.

(56) References Cited

U.S. PATENT DOCUMENTS

| 7,933,843 | B1 | 4/2011 | von Groll et al. |
| 2003/0188117 | A1 | 10/2003 | Yoshino et al. |
| 2007/0047279 | A1 | 3/2007 | Evans et al. |
| 2009/0125341 | A1* | 5/2009 | Somoza et al. .................... 705/5 |
| 2009/0129250 | A1 | 5/2009 | Katata et al. |
| 2009/0265780 | A1 | 10/2009 | Korkus et al. |

OTHER PUBLICATIONS

Anonymous; "File Format", Wikipedia, Nov. 23, 2010, pp. 1-9, XP55008211, http://en.wikipedia.org/w/index.php?title=File_format&oldid=398384802.
U.S. Appl. No. 12/956,082, entitled "Framework for System Communication for Handling Data", filed Nov. 30, 2010.

* cited by examiner

*Primary Examiner* — Craig Dorais
(74) *Attorney, Agent, or Firm* — Patterson & Sheridan, LLP (57) ABSTRACT

Techniques for making internal data from a source application available through an application programming interface ("API"). Embodiments may analyze a source application to determine a storage location and a first storage format of internal data, wherein the source application does not provide an API through which the internal data is accessible. Embodiments may then extract the internal data from the storage location, and convert the extracted data from the first storage format to a common storage format. Embodiments may then provide an API to make the converted data available.

8 Claims, 5 Drawing Sheets

FRAMEWORK FOR SYSTEM COMMUNICATION FOR HANDLING DATA

CROSS-REFERENCE TO RELATED APPLICATIONS

This application is a continuation of co-pending U.S. patent application Ser. No. 12/956,082, filed Nov. 30, 2010. The aforementioned related patent application is herein incorporated by reference in its entirety.

BACKGROUND

Embodiments of the invention relate to data management, and more particularly, to providing an application programming interface (hereinafter "API") for the internal data of a source application.

Many production environments include older software applications that are still in use, but are no longer in development. While these older software applications may be functioning properly in their originally-intended role, often times a business may wish to modify these applications to introduce new features. For instance, the business may wish to add a reporting mechanism to a software application that generates and maintains a set of data. However, such modifications are often difficult. For instance, the business may not have access to the source code for the original application. As a second example, even if the source code is available, the architecture used to develop the original application may not easily support the introduction of new features. Continuing this example, this problem may be compounded if the software developers are no longer familiar with the programming language the source code for the older software application is written in. Additionally, even creating an external tool to construct reports using the data may be difficult, since the older software application may not provide an API for accessing the data.

SUMMARY

Embodiments of the invention provide methods, systems and products for making data maintained by a source application accessible. The method, system and product include identifying internal data maintained by a source application that is not exposed to any external application via any application programming interface ("API") provided by the source application. Such identification includes identifying a location where the source application maintains the internal data and determining a first format the source application maintains the internal data in. The method, system and product further include retrieving the data from the identified location and then converting the retrieved data from the determined first format to a common format. Upon converting the data, the method, system and product include providing an API through which the converted data may be accessed.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

It can often be difficult to modify existing applications to include additional functionality. This is particular true with existing applications that were written some time ago and have been out of the development phase for a substantial period of time. For instance, the developers wishing to make the modification may not have access to the source code of the existing application, or if they do, they may be unfamiliar with the source code or even the language the source code is written in. Even creating an external tool to perform the additional function may be difficult, particularly in the case where the existing applications do not feature an application programming interface (hereinafter "API") for accessing the required data from the existing application.

As an example, an existing application may perform rebate processing for customers of a business. For the purposes of this example, assume that the source code for the existing application is not available for modification. In this example, the existing application may accept a rebate submission from a customer, and upon determining the submission is valid, may issue a rebate to the customer. However, assume for purposes of this example, the existing application has no reporting functionality (e.g., to generate a report showing approved rebate submissions vs. denied rebate submissions), and further assume that the existing application does not provide an API for accessing the data relating to rebate processing (e.g., a number of submissions that the existing application denied). In such an example, the business may wish to add reporting functionality to the existing application. However, because the source code for the existing application is not available and because the existing application does not provide an API for accessing rebate processing data, such a modification may be difficult for developers to implement.

Embodiments of the invention provide an information discovery component which may provide an API for particular data in existing software applications which do not have a native API for the particular data. Embodiments may analyze an existing application to determine a storage location for desired data. Examples of storage locations in this context include, without limitation, data stored on a disk and data contained in system memory. In one embodiment, the information discovery component may monitor actions taken by the existing software application to determine the storage location of the desired data. Additionally, embodiments may determine a format the data is stored in. For example, the information discovery component may monitor actions taken by the existing software application to determine a particular data structure that is used to store the data. Upon determining whether the data is stored and what format the data is stored in, embodiments may retrieve the data from the determined location. Embodiments of the invention may then convert the data from the determined format to a common format. Once the data is converted to the common format, embodiments may provide an API through which users and other applications may access the converted data. By doing this, embodiments of the invention may provide an API for the internal data of an existing application, data which otherwise would be unavailable to users and applications outside of the existing application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the information discovery component) or related data available in the cloud. For example, the information discovery component could execute on a computing system in the cloud and provide an API for one or more source applications executing on computing systems in the cloud. In such a case, the information discovery component could retrieve data from the source applications and store the retrieved data at a storage location in the cloud. The information discovery component may then provide an API through which target applications may access the retrieved data. Doing so allows the target applications to access data from the source applications from any computing system attached to a network connected to the cloud (e.g., the Internet).

Figure 1:
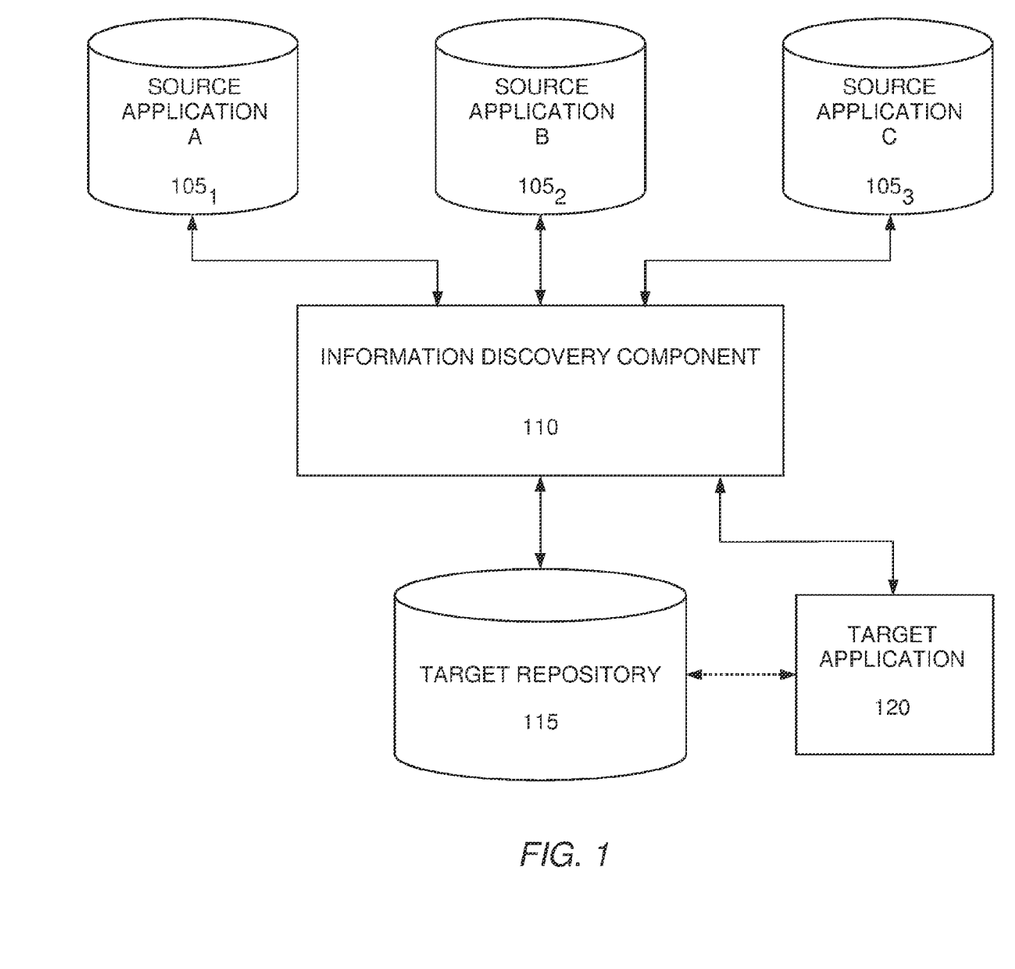
FIG. 1 is a block diagram illustrating a configuration for an information discovery component, according to one embodiment of the present invention.

Referring now to FIG. 1, FIG. 1 is a block diagram illustrating a configuration for an information discovery component, according to one embodiment of the present invention. As shown, the system 100 contains source applications 105 communicatively coupled to an information discovery component 110. As used herein, a "source application" generally refers to any software application which maintains some internal data, but does not provide an API for the internal data. As an example, a rebate processing application may generally receive requests for rebate redemptions, and upon determining that a particular redemption request is valid, may grant a rebate for the request. In such an example, the application may maintain internal data on requests that are denied, but may not make this internal data available through an API. Furthermore, it is entirely possible that a source application as defined herein may provide some sort of API, but that the provided API may not make particular internal data available. In such a scenario, even though the application does provide an API of sorts, the application may still be qualified as a source application.

The information discovery component 110 may generally monitor the actions taken by a source application 105 to identify internal data maintained by the source application. For example, the information discovery component 110 may determine that source application A $105_1$ maintains its internal data by writing the data to a file on a hard disk, whereas source application B $105_2$ maintains its internal data in a data structure in system memory. The information discovery component 110 may further determine a storage format that the data is stored in. For example, if the source application 105 is a rebate processing application, the information discovery component 110 may determine that the source application 105 maintains rebate redemptions requests in a file on a hard disk in the format of "<RequestID>, <TimeReceived>, <Status>".

Upon identifying the internal data of a source application 105, the information discovery component 110 may retrieve the internal data from the determined storage location (e.g., system memory). Once the internal data is retrieved, the information discovery component 110 may convert the retrieved data from the determined format to a common format, and store the converted data in a target repository 115. In one embodiment, the target repository 115 is a database which is used to store the extracted data. In such an embodiment, the information discovery component 110 may extract the internal data from the source application 105 and convert the extracted data into a format consistent with the database schema. For instance, for extracted data in the format of "<RequestID>, <TimeReceived>, <Status>", the information discovery component 110 may insert each of the data values into a respective database column (e.g., a RequestID column, a TimeReceived column, and a Status column). The information discovery component 110 may then provide an API through which applications may access the data in the target repository (i.e., in this example, the database).

Additionally, the information discovery component 110 may be configured to extract data from multiple source applications 105 and multiple instances of the same source application 105 and to convert the extracted data into a common format. The information discovery component 110 may then consolidate the converted data in the target repository 115. Once the data is converted and stored in the target repository 115, the information discovery component 110 may provide an API through which one or more target applications 120 may access the consolidated data in the target repository 115.

Advantageously, by doing this, the information discovery component 110 may effectively provide an API for data in existing software applications for which the software applications themselves do not provide an API. As such, embodiments may enable the modification of existing software applications, even when the source code of the existing software applications is unavailable, and even when the existing software applications do not provide an API for the desired internal data. Continuing the above example of a rebate processing application, embodiments of the invention may be used to add reporting functionality to the application by extracting the relevant internal data from the rebate processing application, and then making this data available for reporting functions by providing an API for the target repository 115. Advantageously, embodiments may save substantial time and resources for developers by enabling the modification of existing software applications, modifications which otherwise may consume a substantial amount of developer time and resources, or where the source code for the existing application is not available, may not be feasibly possible.

Figure 2:
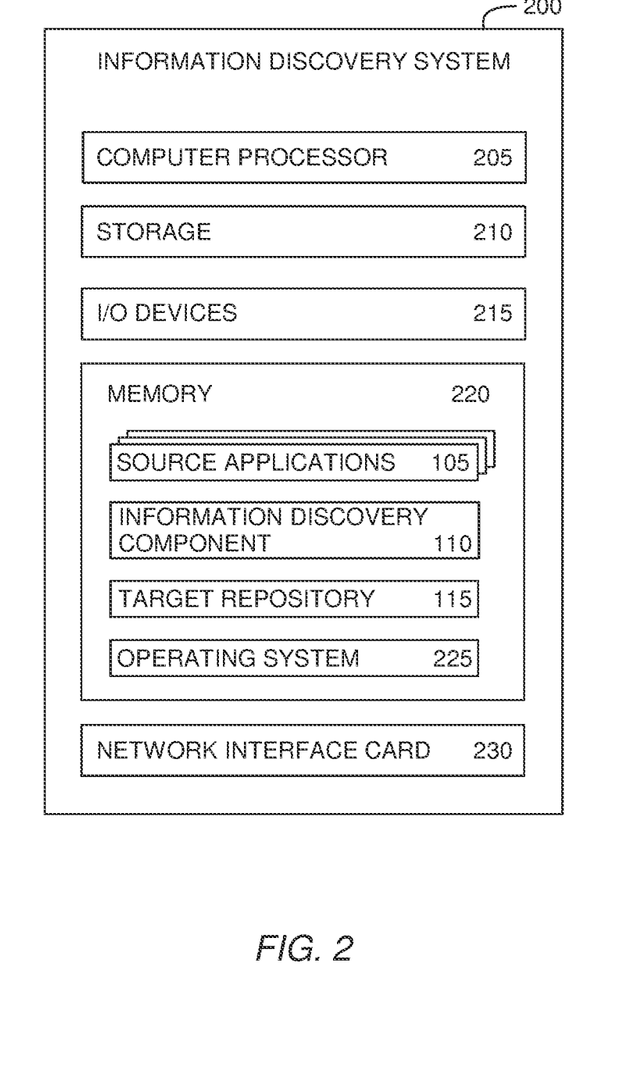
FIG. 2 is a block diagram illustrating a computer system configured to run an information discovery component, according to one embodiment of the present invention.

FIG. 2 is a block diagram illustrating a computer system configured to run an information discovery component, according to one embodiment of the present invention. As shown, the information discovery system 200 includes, without limitation, a central processing unit (CPU) 205, system storage 210, I/O devices 215, a memory 220, and a network interface card 230. I/O devices 215 may represent a variety of input and output devices, including keyboards, mice, visual displays, printers and so on. The information discovery system 200 may connect to a network (e.g., the Internet) using the network interface 230.

The CPU 205 generally retrieves and executes programming instructions stored in the memory 220. Similarly, the CPU 205 stores and retrieves application data residing in the memory 220. An interconnect (not shown) may be used to transmit programming instructions and application data between the CPU 205, storage 210, I/O devices 215, network interface 230, and memory 220. CPU 205 is included to be representative of a single CPU, multiple CPUs, a single CPU having multiple processing cores, and the like. Furthermore, CPU 205 may be any processor capable of performing the functions described herein. Although memory 220 is shown as a single entity, memory 220 may include one or more memory devices having blocks of memory associated with physical addresses, such as random access memory (RAM), read only memory (ROM), flash memory or other types of volatile and/or non-volatile memory. Storage 210, such as a hard disk drive, solid state device (SSD), or flash memory storage drive, may store non-volatile data. Furthermore, as will be understood by one of ordinary skill in the art, any computer system capable of performing the functions described herein may be used.

In the pictured embodiment, memory 220 contains a plurality of source applications 105, an information discovery component 110, a target repository 115 and an operating system 225. The target repository 115 is generally used for storing data. In one embodiment, the information discovery component 110 may extract data from the source applications 105, convert the extracted data to a common format, and may store the converted data in the target repository 115. Generally, the operating system 225 may be any operating system capable of performing the functions described herein. Furthermore, although various elements are shown as residing in memory 220 on the information discovery system 200, such a depiction is without limitation. Of course, one of ordinary skill in the art will recognize that the source applications 105, information discovery component 110, and target repository 115 may reside on more than one computer system 200, and that such a depiction is for illustrative purposes only.

Generally, the information discovery component 110 may analyze the source applications 105 to identify internal data of the applications 105. For instance, the information discovery component 110 may determine characteristics of the source applications 105, such as memory usage and areas of memory that are used by the application. The information discovery component 110 may then use such information to determine what internal data to extract from the source application 105, and where such internal data is stored. Additionally, the information discovery component 110 may monitor one or more actions taken by the source application 105 to identify the internal data and where the data is stored. As an example, if the information discovery component 110 determines a source application 105 is consistently writing data to a particular file on the hard disk (e.g., storage 210), the information discovery component 110 may determine that the source application 105 is storing internal data in the particular file. In this example, the information discovery component 110 may then parse the data contained in the file to determine a format of the data.

The information discovery component 110 may then extract the internal data of the source application 105. As an example, if the information discovery component 110 determined that an exemplary source application 105 stores its internal data as a data structure in system memory 220, the information discovery component 110 may then read the data from the memory location. Upon extracting the internal data, the information discovery component 110 may convert the data to a common format and may store the converted data in the target repository 115. Continuing the above example, the information discovery component 110 may retrieve hexadecimal values from the determined memory location, and may convert these values into their decimal equivalents. The information discovery component 110 may then store these converted decimal values in a target repository 115, such as a database. Once the converted values are stored in the target repository 115, the information discovery component 110 may provide an API through which users and applications may the converted values.

Advantageously, embodiments of the invention may be used to provide an API for internal data in an existing software application for which the software application does not provide an API. That is, although the existing application (e.g., source application 105) may calculate and maintain certain internal data, the application may not provide any mechanism for outside entities (e.g., users, applications, etc.) to access this internal data. As such, by providing an API through which external entities may access this internal data, embodiments of the invention enable access to the internal data values of the existing software application without modifying the existing software application itself. This is advantageous because, by using embodiments of the invention, additional functionality may be added to the existing software application, even though the existing application itself does not provide any API to support such additional functionality.

Thus, as an example, once embodiments provide the API through which the internal data of the existing application may be accessed, an external reporting tool may be developed to generate reports using the internal data. In this way, a reporting mechanism may be added to an existing software application, without modifying the existing application itself, and even though the existing application provides no API for accessing the data used in the reports. As such, embodiments of the invention may save substantial amounts of development time and cost that may otherwise be spent modifying the existing software application, and may enable the addition of new functionality for existing software in situations where it would otherwise be infeasible to add the new functionality. For example, in a situation where the source code for the existing software application is unavailable, adding the additional functionality (e.g., a reporting mechanism) to the application itself may be impractical or even impossible. However, by using embodiments of the invention, external tools may be created to use the API provided by the information discovery component 110, which may add additional functionality to an existing software application.

Furthermore, because embodiments of the invention provide an API through which data may be accessed by external entities, embodiments provide the additional advantage of promoting a modular software design, even for software application that were not originally designed with this concept in mind. That is, multiple external tools may be designed to utilize the provided API, and these external tools may be easily added, removed and replaced from service. As such, even though the original existing software application may not have been created with a modular design in mind (at least not for the particular internal data being extracted), embodiments of the invention enable the modular modification of the existing software application by providing an API through which the internal data may be accessed.

Figure 3:
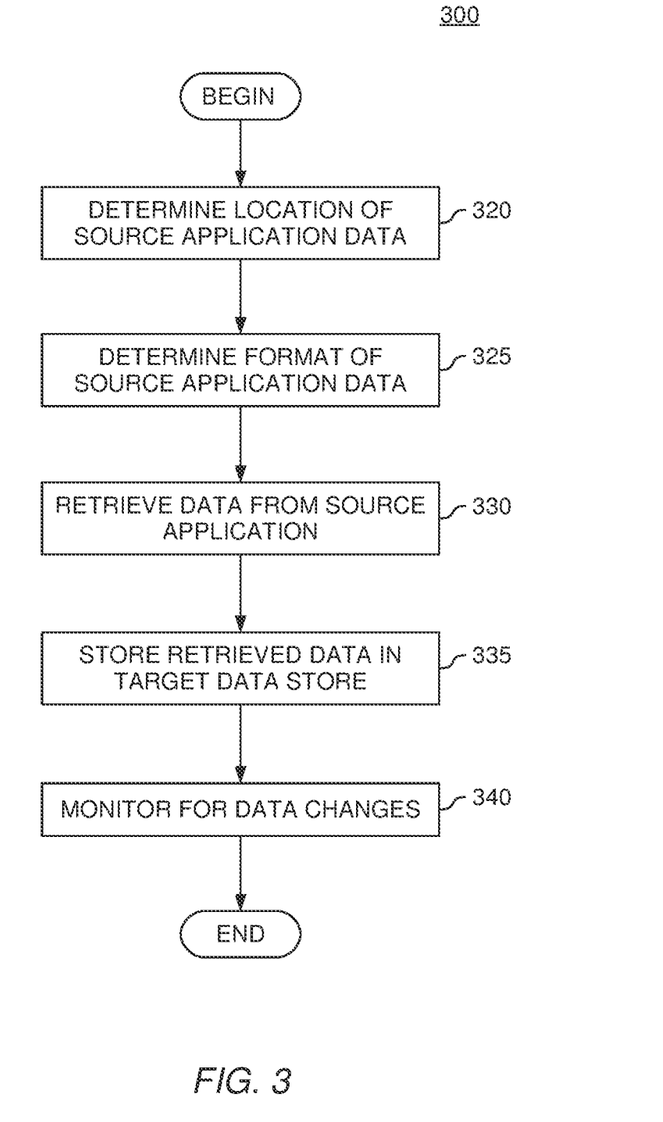
FIG. 3 is a flow diagram illustrating a method for retrieving data from an application, according to one embodiment of the present invention.

FIG. 3 is a flow diagram illustrating a method for retrieving data from an application, according to one embodiment of the present invention. As shown, the method 300 begins at step 320, where the information discovery component 110 determines a location of source application data. Once the location of the data is determined, the information discovery component 110 determines a format of the source application data (step 325). In one embodiment, the source application may be capable of exporting the data in one or more data formats. In such an embodiment, for a particular set of exported data, the information discovery component 110 may determine which format the data was exported in. For example, for a particular file containing exported data, the information discovery component 110 may analyze information such as the file extension, header information in the file, content of the file, or other attributes of the file to determine the format of the exported data in the file. In another embodiment, the information discovery component 110 may specify a format for the source application to export data in.

The information discovery component 110 then retrieves the source application data from the determined location (step 330). As discussed above, the determined location may generally be any location in which data may be stored. Examples of such a location include, without limitation, system storage (e.g., storage 210) and system memory (e.g., memory 220). Upon retrieving the source application data, the information discovery component 110 stores the retrieved data in a target data store (step 335). In one embodiment, the target data store (e.g., target repository 115) is a database. Additionally, as discussed above, the information discovery component 110 may also be configured to convert the extract data to a common format before storing the data in the target data store. Once the data is stored, the information discovery component 110 continues to monitor the determined location for changes to the data (step 340) and the method 300 ends.

Figure 4:
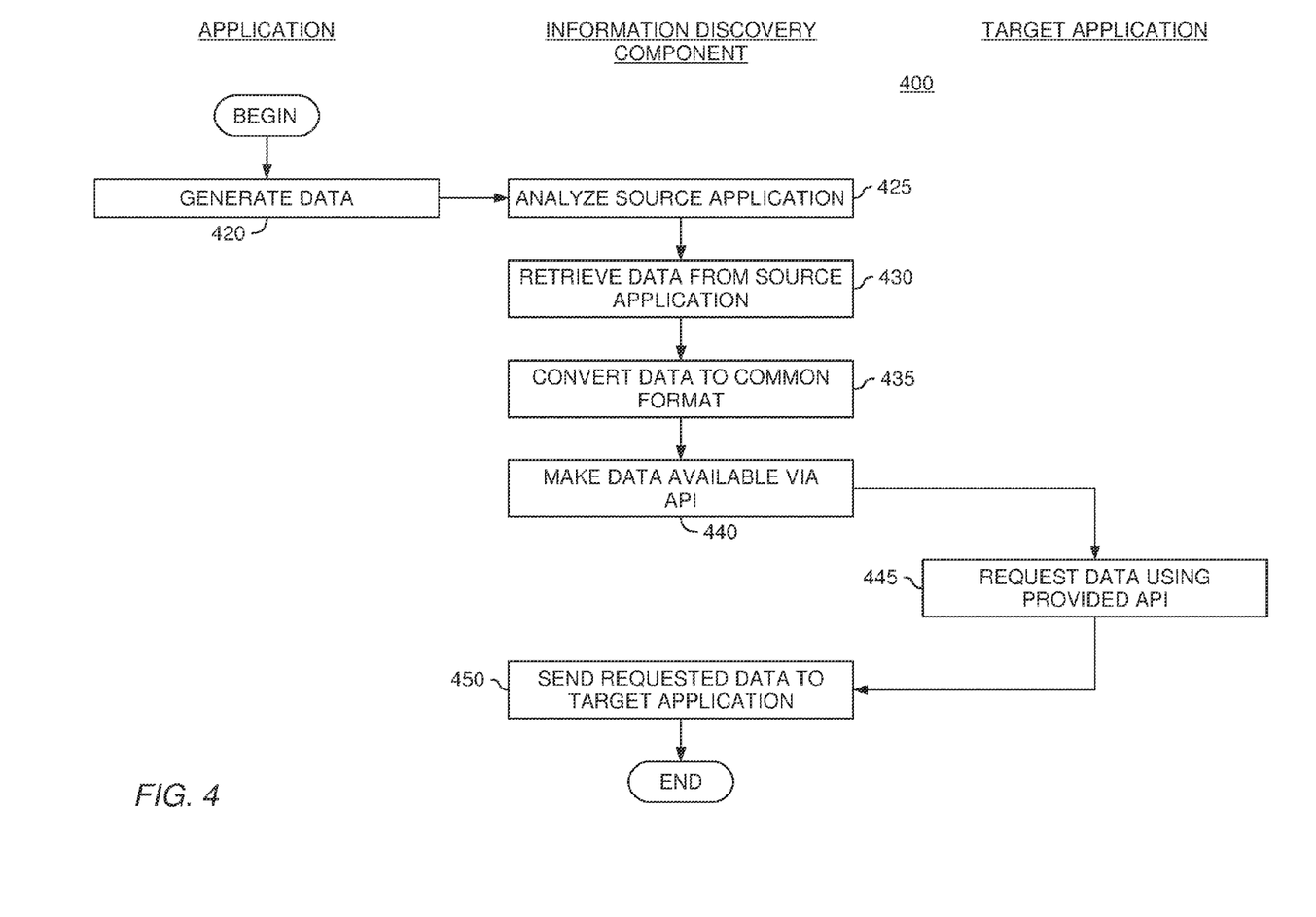
FIG. 4 is a flow diagram illustrating a method of providing an API for an application, according to one embodiment of the present invention.

FIG. 4 is a flow diagram illustrating a method of providing an API for an application, according to one embodiment of the present invention. As shown, the method 400 begins at step 420, where a source application generates application data. For purposes of this example, assume that source application 105 does not provide any sort of API for accessing the generated data. Furthermore, the data represents any data capable of being used by a source application 105, which may generally include any internal data maintained by the source application 105. The information discovery component 110 then analyzes the source application to determine a location for the internal data and a format of the internal data (step 425). As discussed above, in one embodiment, the information discovery component 110 may analyze the source application to determine if an export mechanism exists for exporting the internal data. In such an embodiment, the information discovery component 110 may specify a location for the source application to export the internal data. As an example, the information discovery component 110 may specify a particular path and filename for the source application to store the exported data in.

In one embodiment, the information discovery component 110 analyzes the source application 105 by monitoring one or more actions taken by the source application. For example, if the information discovery component 110 determines that the source application consistently writes to a particular file on the system storage, the information discovery component 110 may determine that the internal data is stored in the particular file. The information discovery component 110 may then determine a format the internal data is stored in. For example, continuing the above example of a rebate processing application, the information discovery component 110 may monitor incoming requests for the rebate processing application, and may cross-reference information from these requests (e.g., a request ID identifying a particular request) with the stored internal data to determine the storage format of the internal data.

Upon analyzing the source application, the information discovery component 110 retrieves the internal data from the determined location (step 430). Once the data is retrieved, the information discovery component 110 converts the retrieved data into a common format (step 435). Generally, the common format may be any format which is usable by the requesting target applications 120 requesting the converted data. The information discovery component 110 then makes the converted data available by providing an API through which target applications 120 may access the data (step 440). In one embodiment, the information discovery component 110 additionally stores the converted data in a target repository 115. Furthermore, as discussed above, the provided API may be any API which is usable by the requesting target applications 120, but ideally should be consistent with the common format of the converted data.

At some later point in time, a target application 120 submits a request for particular data using the provided API (step 445). As an example, the target application 120 may be a reporting tool created to generate reports using the extracted internal data. Upon receiving the request, the information discovery component 110 sends the requested data to the target application (step 450). In one embodiment of the invention, the information discovery component 110 may perform authentication and authorization functions for the target application before sending the requested data to the target application. Once the requested data is transmitted from information discovery component 110 to the target application 120, the method 400 ends.

Figure 5:
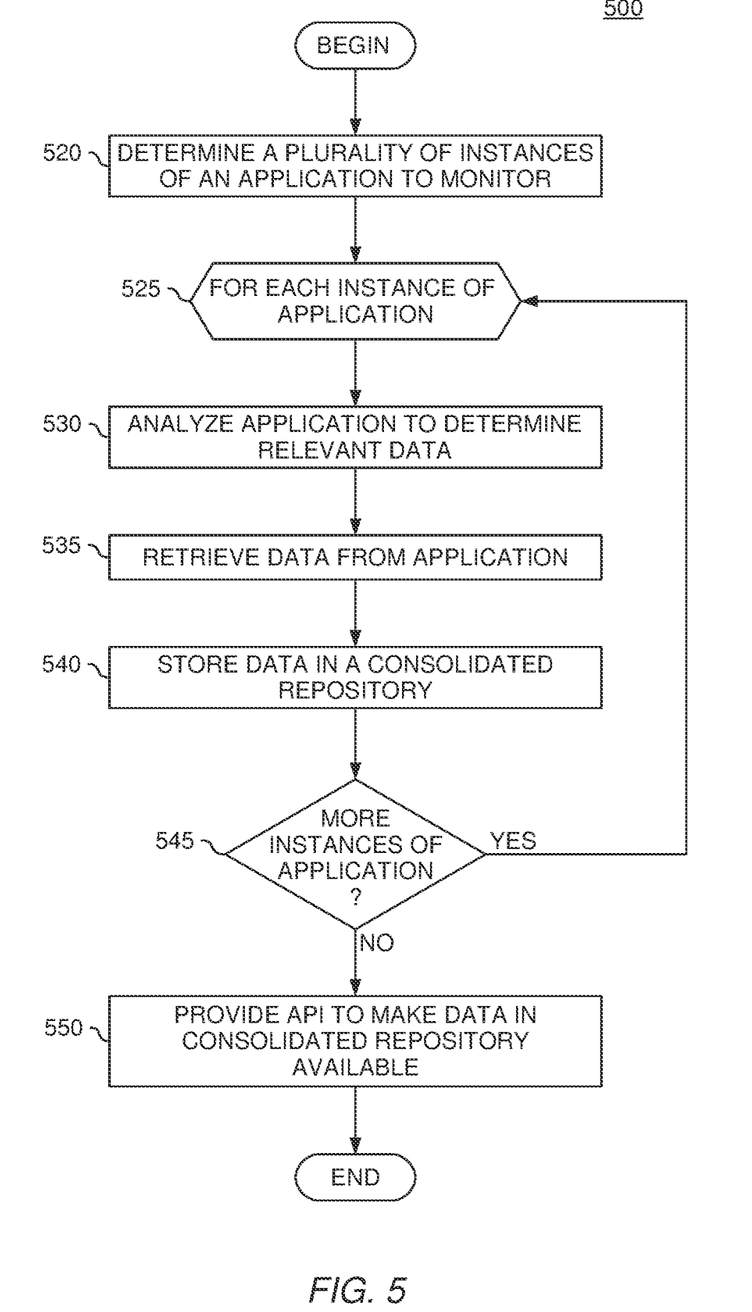
FIG. 5 is a flow diagram illustrating a method of providing an API for a plurality of instances of an application, according to one embodiment of the present invention.

FIG. 5 is a flow diagram illustrating a method of providing an API for a plurality of instances of an application, according to one embodiment of the present invention. As shown, the method 500 begins at step 520, where the information discovery component 110 determines a plurality of instances of an application to monitor. The method 500 then enters a loop at steps 525-545, where, for each instance of the application (step 525), the information discovery component 110 analyzes the application to determine internal application data to extract (step 530). In one embodiment of the invention, the information discovery component 110 may identify all extractable data in the source application. In another embodiment, the information discovery component 110 may be configured to identify particular internal data of the source application to extract based on one or more predetermined criteria.

Once the information discovery component 110 analyzes the application, the information discovery component 110 retrieves the internal data from the identified location (step 535). The information discovery component 110 then stores the retrieved data in a consolidated repository (step 540). In one embodiment, the information discovery component 110 first converts the retrieved data to a common format before storing the data in the consolidated repository. As discussed above, the common format is generally any format which may be used for storing the extracted data. Additionally, in a preferred embodiment, the common format should generally be consistent with any API provided by the information discovery component 110.

The information discovery component 110 then determines whether there are more instances of the application to process (step 545). If the information discovery component 110 determines there are more instances of the application left to process, the method begins again at step 525 with the next instance of the application. If, instead, the information discovery component 110 determines that there are no more instances of the application to process, the information discovery component 110 provides an API to make the data in the consolidated repository available (step 550). Once the information discovery component 110 provides the API for the consolidated repository, the method 500 ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for making internal data maintained internally by a source application accessible, comprising:
    monitoring, by a discovery application separate from the source application, a plurality of actions taken by the source application;
    analyzing the plurality of actions to identify internal data maintained by the source application comprising:
        identifying a location within a first file where the source application maintains the internal data, based on at least one of the plurality of actions; and
        determining a first storage format the source application maintains the internal data in, based on at least one of header information for the first file, a file extension of the first file, and at least a portion of content contained in the first file;
    retrieving the data from the identified location;
    converting, by operation of one or more computer processors, the retrieved data from the determined first storage format to a common format;
    upon converting the retrieved data, storing the converted data within a database; and
    providing an API for accessing the converted data within the database.

2. The computer-implemented method of claim 1, wherein the source application is not configured to output the internal data, thereby rendering the internal data inaccessible to any external application without intervention by the discovery application in the form of providing the API, wherein the external application is configured to access the API, wherein the source application, discovery application, and external application are separate applications, and wherein the method further comprises:
    transmitting a request to the source application, wherein the request specifies an export location for the source application to export the internal data to, and
    wherein retrieving the identified internal data comprises retrieving export data from the export location specified in the request.

3. The computer-implemented method of claim 1, further comprising:
    transmitting a request to the source application, wherein the request specifies an export format for the source application to use in exporting the internal data.

4. The computer-implemented method of claim 1, further comprising:
    receiving a request from a requesting entity through the provided API to access at least a portion of the converted data; and
    responsive to receiving the request, transmitting the at least a portion of the converted data to the requesting entity.

5. The computer-implemented method of claim 4, further comprising:
    authenticating the requesting entity to verify an identity of the requesting entity; and
    authorizing the requesting entity to verify one or more access rights of the requesting entity,
    wherein the at least a portion of the converted data is transmitted only upon successfully authenticated and authorizing the requesting entity.

6. The method of claim 1, wherein the at least one action of the plurality of actions further comprises at least one write operation to the data structure performed by the source application.

7. A method for making internal data accessible through an application programming interface (API), wherein the internal data is maintained internally by a source application, and wherein the internal data comprises data that is not exposed to any external application via any API provided by the source application, comprising:
    monitoring, by a discovery application separate from the source application, a plurality of actions taken by the source application to detect a write operation to a first file;
    identifying a location within the first file where the source application maintains the internal data, based at least in part on the detected write operation to the data structure;
    determining a first storage format the source application maintains the internal data in, based on at least one of header information for the first file, a file extension of the first file, and at least a portion of content contained in the first file;
    retrieving the internal data from the identified location;
    converting the retrieved internal data from the determined first storage format to a common format; and
    providing, by operation of one or more computer processors, the API for accessing the retrieved internal data, whereby the retrieved internal data is accessible to at least one external application via the provided API.

8. A computer-implemented method for making internal data maintained internally by a source application accessible, comprising:
    monitoring, by a discovery application separate from the source application, a plurality of actions taken by the source application;
    analyzing the plurality of actions to identify internal data maintained by the source application, wherein the source application does not expose the internal data to any external application via any application programming interface ("API") provided by the source application, wherein the source application is not configured to output the internal data, and wherein the source application, discovery application, and external application are separate applications;
    identifying a location where the source application maintains the internal data, by transmitting a request to the source application specifying an export location for the source application to export the internal data to;
    retrieving the export data from the export location specified in the request;
    determining a first format of the retrieved export data;
    converting, by operation of one or more computer processors, the retrieved data from the determined first format to a common format; and
    providing an API for accessing the converted data.

* * * * *